March 3, 1953

D. A. ARONES 2,630,509

HANDLE SWITCH FOR FLOOR POLISHING
MACHINES AND THE LIKE
Filed Sept. 20, 1951

*INVENTOR.*
DANIEL A. ARONES

BY Jack H. Wicks

ATTORNEY

Patented Mar. 3, 1953

2,630,509

UNITED STATES PATENT OFFICE 2,630,509

HANDLE SWITCH FOR FLOOR POLISHING MACHINES AND THE LIKE

Daniel A. Arones, Minneapolis, Minn., assignor to Advance Machine Company, Minneapolis, Minn., a corporation of Minnesota Application September 20, 1951, Serial No. 247,513

6 Claims. (Cl. 200—157)

My invention relates to an improvement in a handle switch for a polishing machine and the like which is simply and effectively actuated when the operator grasps or releases the handle of the machine.

Floor polishing machines are pushed about and over a floor by means of a handle, and an object of my invention resides in providing an improved form of handle which carries with it a control for the electrical switch controlling the electric motor of the machine.

It is also an object of my invention to provide a transverse flexible spring-urged switch member easily engageable by the hand which extends through the slots of a switch box formed on the handle of the machine. The transverse member is connected to a toggle member of the electrical switch mounted in the box so that when either or both of the handle bars and the transverse switch member are gripped by the operator the electrical switch is turned "on," and when the transverse member is released, the electrical switch returns to "off" position It is a further object to form the transverse flexible spring urged switch member of a central spring core member on which is freely mounted a tubular member which can rotate on the core and with the hand as the transverse switch member is progressively grasped together with the handle bar portions thereby affording a natural grip on the handle and switch member. It is also an object to provide a switch whereby the grasping of the switch member is easy and natural with the grasping of the handle bars and whereby the switch is in an "on" position only when the transverse switch member and handle bars are grasped thus providing also a safety handle.

It is an additional object to provide a handle switch which not only provides natural ease of operation but which is positive in action and simple and economical to manufacture.

The invention will appear more clearly from the following detailed description when taken in connection with the accompanying drawings, showing by way of example a preferred embodiment of the inventive idea.

In the drawings forming part of the application:

Figure 1:
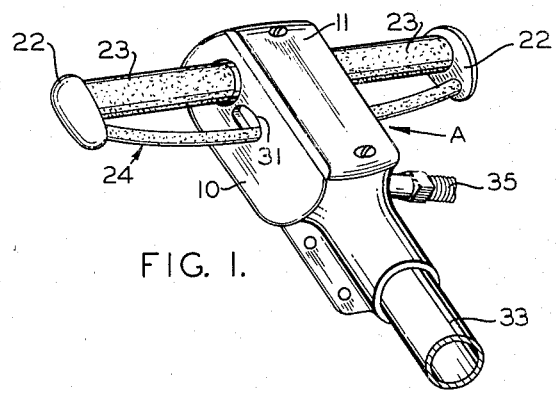
Figure 1 is a perspective view of my handle switch mounted on the upper end of a handle of a floor treating machine.
Figure 2:
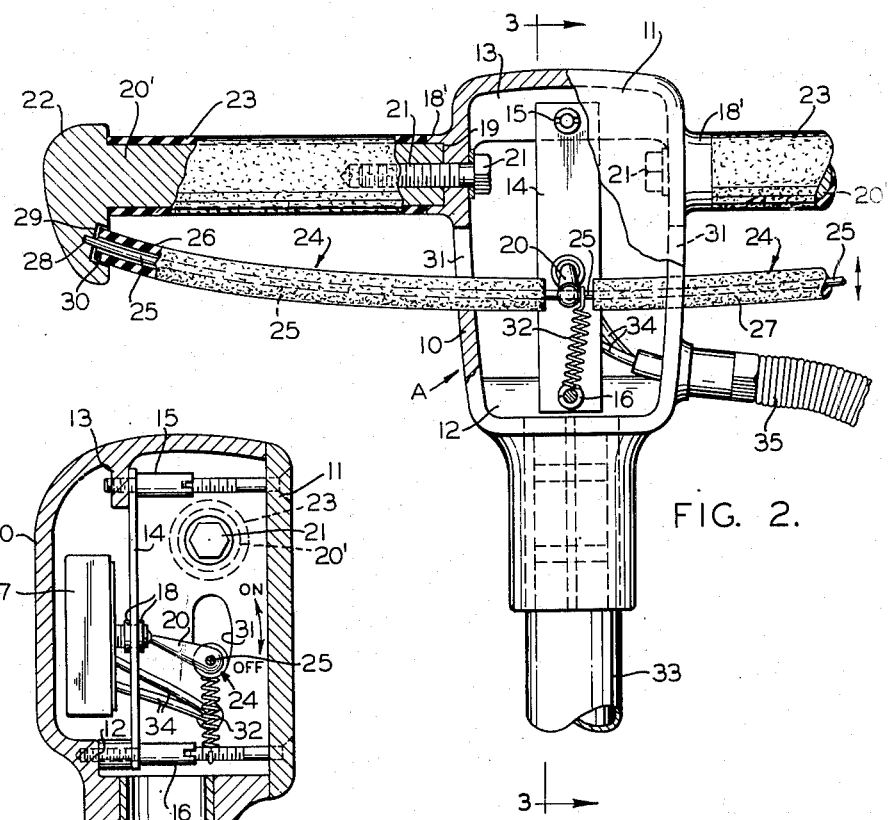
Figure 2 is a partial transverse sectional view thereof.
Figure 3:
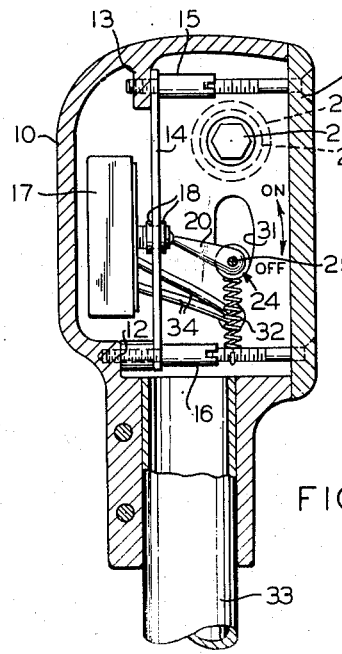
Figure 3 is sectional view on the line 3—3 of Figure 2.

My handle switch A is composed of a housing 10 which is enclosed by means of the removable cover plate 11. Formed on the inside of the housing 10 is the shoulder 12 and the lug 13 on which the plate 14 is mounted by means of the bolts 15 and 16 which are threaded externally and internally. The plate 14 has secured thereto the electrical switch 17 by means of the nuts 18 which are drawn up on the bolt member on both sides of the plate 14. The switch 17 is operated by the toggle member 20 pivotally secured thereto which is in the "off" positon when it is in the downward position shown in Figures 2 and 3.

Extending from the sides of the housing 10 are the shoulders 18' having formed therein the recesses 19 into which are positioned the ends of the bars 20' secured by the bolts 21. The bars 20' have formed on the outer ends thereof the knob portions 22. A resilient covering 23 is applied to the outer surface of the bars 20' for easy hand engagement.

The transverse flexible switch member 24 is made up of a spring core member 25 which is covered by two sections of the tubular outer member indicated as 26 and 27. The inside diameter of the tubular members 26 and 27 is slightly greater than the outside diameter of the spring core member 25 whereby the tubular members 26 and 27 can rotate thereon as the switch actuating member 24 is drawn toward the bars 20' with a progressive encircling gripping action of the operator's hands and fingers on the members 26 and 27 toward the bars 20'.

The outer ends 28 of the core member 25 are secured in the knobs 22 so that the core member 25 extends from one knob 22 to the other in a gradually flat arc formation. The knobs 22 have formed on the inner sides thereof the recesses 29 in which the ends 30 of the tubular portions 26 and 27 can rotate as they are gripped by the hands and fingers as set forth above. The placement of the ends 30 in the recesses 29 aids in supporting both the core member 25 and the tubular members 26 and 27.

The flexible switch member 24 extends from one knob 22 to the opposite knob through the elongated openings 31 formed in each side of the housing 10 and the spring core member 25 is connected to the toggle member 20 at a central break formed in the tubular covering members 26 and 27. The switch member 24 having the spring core member 25 tends to remain against the lower end of the slots 31 of the housing 10 and thus hold the toggle member in an "off"

position, but to give a positive positioning in "off" position the supplementary coil spring 32 is connected to the spring core 25 and the bolt 16.

The housing 10 is secured to the handle 33 of a floor polishing machine or the like thus positioning the switch handle for use. Suitable electrical wires 34 from a source of power enter the housing 10 from a cover member 35 and are connected to the switch 17.

In operating my handle switch the switch member 24 is progressively grasped simultaneously with the handle bar portions 20' and as this is done the core member 25 moves the toggle member 20 upwardly to the "on" position as the tubular members 26 and 27 move upwardly in the slots 31 of the housing. The switch 17 remains "on" as long as the switch member 24 is held toward the handle bar portions 20'. When the switch member 24 is released the toggle 20 is forced to a downward "off" position through the connection with the spring core member and the action of the coil spring 32. The flexible switch member is at rest against the lower edges of the openings 31.

As the hands and fingers grip progressively around both the bars 20' and the switch member 24 there is a rolling action on the tubular cover 26 which rotates on the core 25 with said movement of the fingers grasping the switch member 24 along with the bars 20'. It is apparent that either side of the handle may be grasped to operate the switch and that the machine cannot be turned "on" through the switch unless the handle is grasped.

The invention is not to be understood as restricted to the details set forth since these may be modified within the scope of the appended claims without departing from the spirit and scope of the invention.

Having thus described the invention, what I claim as new and desire to secure by Letters Patent is:

1. In a handle switch, a housing support, a switch having a toggle control mounted in said housing, handle bars secured to each side of said housing and extending at substantially right angles thereto, said housing having openings formed in the sides thereof adjacent said handle bars, a spring core member secured to the outer ends of said handle bars and passing through said openings of said housing and connected substantially centrally thereof to said toggle control, and a flexible tubular cover member mounted on said core member and rotatable thereon for progressive gripping by the hand of the operator in conjunction with either of said handle bars.

2. A handle switch for floor polishing machines and the like including an electrical switch having a toggle control member with an "on" and "off" position, means for supporting said toggle switch, handle means secured to and extending outwardly from said supporting means, a transverse flexible switch member connected centrally to said toggle control and extending outwardly from both sides of said toggle supporting means, said flexible member connected to the outer free ends of said handle means, and spring means for normally holding said flexible switch member in a downward position whereby said toggle control is in an "off" position.

3. In a handle switch, a housing having openings formed in the sides thereof, an electrical switch having a toggle control member with an "on" and "off" position mounted in said housing, handle means extending from the sides of said housing adjacent said openings, said handle means having recesses formed in the ends thereof, a transverse spring core member secured on each end to the outer free ends of said handle means and into said recesses, said core member also secured centrally thereof to said toggle member and extending through said openings of said housing and outwardly of the same, tubular members rotatable on said core member on each side of said toggle and freely and rotatably extending into said recesses to aid in supporting said core member, and spring means connected to said core member and said housing to normally hold said core member spaced from said handle means and maintain said toggle control in an "off" position, said toggle control being placed in "on" position when either of said tubular members is grasped with and toward either of said handle means.

4. An electric switch for floor machines including a hollow central standard leading to the floor machine, a pair of handle grips projecting from each side of said standard adjacent the upper end thereof, an electric switch mounted within the upper end of said hollow standard and flexible rod-like means extending in bowed relation to the ends of said handle grips and spaced centrally therefrom in a manner to be drawn toward said handle grips by the gripping of the operator's hand on said grips and said bowed rod-like means to close said electric switch and to automatically open the same when released from the grip of the hand the outer free ends of said flexible means being secured to the outer free ends of said handle grips.

5. An electric switch operating mechanism associated and spaced from the hand grip means of a standard of a floor machine and the like including a pair of hand grips, an electric switch mounted in the hollow handle centrally between said hand grips, a spring wire rod anchored in the outer ends of said hand grips with the central portion arcing away from said hand grips and connected to the operating lever for closing and opening said electric switch, tubular coverings extending over said arcuated rod adapted to rotate thereon when gripped together with either or both of said hand grips by the hand of the operator which draws said spring rod toward said hand grips to close said switch and automatically open said switch when said spring rod is released.

6. An electric switch operating means for floor machines and the like comprising a hollow standard having hand grips extending from each side thereof, a spring rod formed in bowed formation and extending in spaced relation with respect to the inner ends of said hand grips for controlling the movement of the machine, said rod being connected centrally thereof to an electric switch whereby when said rod is squeezed toward said hand grips on either side of said standard the electric switch is closed and when the rod is released, said switch is opened.

DANIEL A. ARONES.

REFERENCES CITED

The following references are of record in the file of this patent:

UNITED STATES PATENTS

| Number | Name | Date |
| --- | --- | --- |
| 1,911,444 | Fator | May 30, 1933 |
| 1,944,157 | Forman | Jan. 23, 1934 |
| 2,211,603 | Lang | Aug. 13, 1940 |